Figure 1:
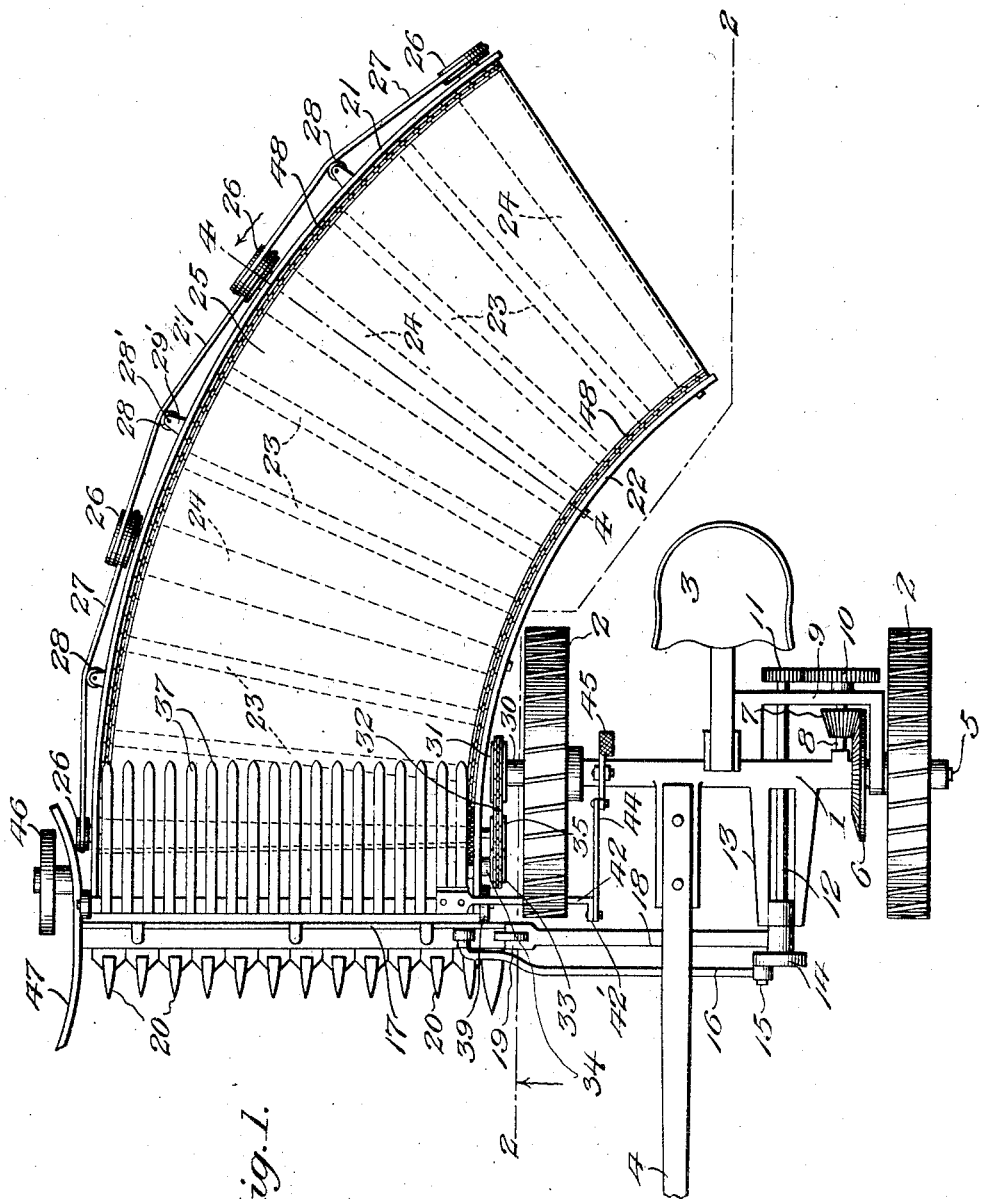

A. C. CHRISTENSEN.
REAPING ATTACHMENT FOR MOWING MACHINES.
APPLICATION FILED JULY 23, 1910.

1,025,862.

Patented May 7, 1912.
2 SHEETS—SHEET 1.

Witness:
Edwin G. McKee
Wm. Bagger

Inventor
Andrew C. Christensen
By Victor J. Evans
Attorney

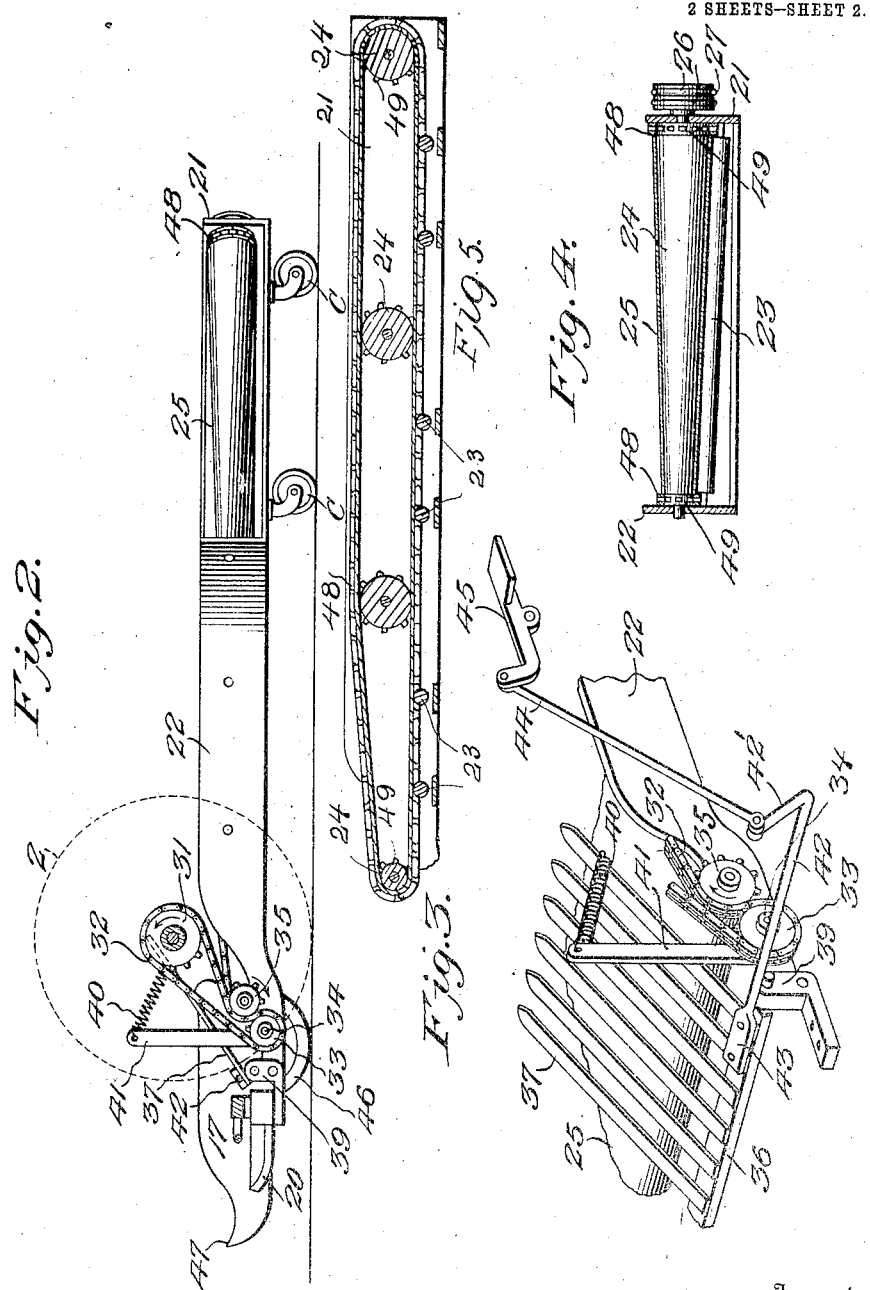

UNITED STATES PATENT OFFICE.

ANDREW C. CHRISTENSEN, OF DES MOINES, IOWA.

REAPING ATTACHMENT FOR MOWING-MACHINES.

1,025,862.　　　　Specification of Letters Patent.　　Patented May 7, 1912.

Application filed July 23, 1910. Serial No. 573,486.

*To all whom it may concern:*

Be it known that I, ANDREW C. CHRISTENSEN, a citizen of the United States of America, residing at Des Moines, in the county of Polk and State of Iowa, have invented new and useful Improvements in Reaping Attachments for Mowing-Machines, of which the following is a specification.

This invention relates to reaping attachments for mowing machines, and the principal object of the same is to provide a simple and efficient reaping attachment to be applied to and used in connection with an ordinary mowing machine.

In certain sections of the country farmers are provided with the ordinary grass mower, but grain being raised only in comparatively small quantities, the expense of a reaping machine is so great as to render it undesirable to purchase the same.

The invention is designed to supply a simple and efficient attachment which may be used in connection with a mowing machine of ordinary construction for the purpose of reaping small grain of various kinds.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a plan view of a mowing machine provided with the improved attachment. Fig. 2 is a longitudinal sectional view taken on the line 2—2 in Fig. 1. Fig. 3 is a perspective view of the straw dropper and mechanism for actuating the same. Fig. 4 is a transverse sectional view of the endless straw carrier taken on the line 4—4 in Fig. 1. Fig. 5 is a sectional detail view taken longitudinally through the platform, omitting the cutting and bunching devices.

Corresponding parts in the several figures are denoted by like characters of reference.

Referring to the drawings, the numeral 1 designates the main frame of an ordinary mowing machine which is provided with spindles carrying ground wheels 2 and with a seat 3 and a tongue or pole 4. Mounted upon the axle spindle 5 is a beveled gear wheel 6 which meshes with a pinion 7 on a shaft 8 mounted in a frame 9 connected with the main frame and carrying a gear wheel 10 which meshes with a pinion 11 on a counter shaft 12 mounted in the frame 9 and extending forwardly through a supplementary frame 13. On the end of the shaft 12 is a crank disk 14 provided with a wrist pin 15 to which is pivoted one end of a pitman 16, the other end of which is connected with a reciprocatory cutter bar 17 mounted in guides.

The reaping attachment is connected to the mower frame by means including a link bar 18, one end of which is mounted upon the shaft 12 and to the opposite end of which the reaper frame is hinged or pivoted in any suitable manner, as by means of a yoke 19. The cutter bar 17 is of the usual type, and the finger bar 20 may also be of the usual or any ordinary and well known type.

A straw carrier or platform is provided which constitutes a part of the reaper attachment. Said straw carrier comprises a frame including two curved substantially concentric side bars 21 and 22, the forward ends of which are suitably connected with the finger bar of the cutting apparatus, the rear ends of said side bars being curved so as to project rearwardly of the wheel supported frame of the mowing machine proper. The side bars 21, 22 afford bearings for radially disposed cylindrical rollers 23 and tapering rollers 24, said rollers serving to support and to guide an endless apron 25.

The apron is moved to discharge the straw over the rear end thereof by means of grooved pulleys 26 on the outer ends of the tapering rollers 24 and by means of flexible bands 27 extending around said grooved pulleys and passing over guide pulleys 28 arranged intermediate the pulleys 26, the shafts 28' supporting the guide rollers 28 being disposed in planes approximately at right angles to the planes of the axes about which the grooved pulleys 26 revolve, the shafts 28' being supported in brackets 29 or upon the frame bar 21.

Mounted upon the hub 30 of one of the ground wheels is a sprocket wheel 31 which is connected by a chain 32 with a sprocket wheel 33 mounted upon a spindle 34 extending from the frame bar 22. One of the tapering rollers 24 carries a sprocket wheel 35 over which the chain 32 is guided, thereby transmitting motion in the proper direction to the endless carrier or apron 25. The frame of the straw carrier is provided with wheels or casters C, whereby it is supported in proper position.

A dropper designed for the purpose of collecting a sufficient quantity of straw to form a bundle and to drop the same upon the apron or carrier 25 consists of a bar 36 having a series of slats 37 secured thereto, said dropper being arranged directly in front of the endless carrier with the slats 37 overlapping the same. The ends of the bar 36 are pivoted in suitable brackets 39 connected with the frame of the carrier. In order to hold the dropper in an elevated position, a spiral spring 40 is connected at one end with one of the slats 37 and at the opposite end with an upright 41 supported upon the bar 22 of the frame. In order to depress the dropper so as to deposit a bundle of straw upon the apron 25, an arm 42 is provided having a flattened portion 43 which is secured upon some of the slats 37, said arm having a crank 42' which is connected by a link 44 with a foot lever or treadle 45 fulcrumed upon the frame of the mower in convenient position to the operator who, by actuating said treadle, may rock the bar 36 so as to depress the slats 37 against the tension of the spring 40 until they lie flatwise upon the endless apron or carrier which will thus convey the bundle in a rearward direction and discharge it over the rear or tail end of said carrier. The front end of the reaper attachment is supported upon a wheel 46, and a shoe or guard plate 47 may be provided.

The endless carrier 25, which is composed of textile or other suitable flexible material, is provided at the side edges thereof with chains or link belts 48 which are guided over sprocket wheels 49 mounted upon or connected with the ends of the tapering rollers 24 adjacent to the inner faces of the side bars 21, 22 of the frame. The carrier apron will thus be kept in smooth and flat condition for operating successfully.

The operation of the invention may be briefly described as follows:—With the attachment in place, as shown in Figs. 1 and 2, the machine is driven over the field. If the grain should be wet, the driver will place his foot upon the pedal 45 and depress the dropper upon the apron or carrier, thus causing the straw to be spread out upon the ground as the machine is carried over the field in order to permit the straw to be dried before it is bundled. If the grain, however, is dry and the straw ready for bundling, then the dropper will be permitted to remain in an upright position until a sufficient quantity to form a bundle has been accumulated, and then by actuating the pedal 45, the bundle or gavel will be discharged over the slats 37 on to the apron 25 and carried in a practically compact mass to be deposited upon the ground in position ready for the bundle.

The improved device as will be seen is of simple construction; it may be readily manufactured at a comparatively slight expense, and it may be readily attached to an ordinary mowing machine with but slight alterations.

Having thus described the invention, what is claimed as new, is:—

The combination with a mowing machine, of a reaping attachment comprising an arcuate frame associated with and extending rearwardly from the cutting apparatus of the machine and terminating in rear of the wheel supported frame of said machine, an endless carrier guided over said frame, a rocking bar supported for oscillation at the front end of the carrier adjacent to and parallel with the cutting apparatus and having slats extending rearwardly above the front portion of the carrier, spring means to sustain the slats in a relatively raised position, and treadle means for actuating the rock shaft to depress the slats upon the carrier.

In testimony whereof I affix my signature in presence of two witnesses.

ANDREW C. CHRISTENSEN.

Witnesses:
JAMES KELLY,
CHARLES COUSINS.